(12) United States Patent
Anderson

(10) Patent No.: US 7,272,689 B2
(45) Date of Patent: Sep. 18, 2007

(54) VARIABLE WRITE BACK DELAY APPARATUS AND METHODS

(75) Inventor: Todd A. Anderson, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 585 days.

(21) Appl. No.: 10/377,953

(22) Filed: Mar. 3, 2003

(65) Prior Publication Data

US 2004/0177223 A1    Sep. 9, 2004

(51) Int. Cl.
*G06F 12/00* (2006.01)
(52) U.S. Cl. .................. 711/143; 711/167; 711/135
(58) Field of Classification Search ............. 711/143, 711/135, 100, 161, 162, 167
See application file for complete search history.

(56) References Cited

U.S. PATENT DOCUMENTS

| 5,751,993 | A * | 5/1998 | Ofek et al. ............. 711/136 |
| 6,286,082 | B1 * | 9/2001 | Moudgal et al. ......... 711/143 |
| 6,928,518 | B2 * | 8/2005 | Talagala ................ 711/135 |
| 7,085,895 | B2 * | 8/2006 | Kishi .................. 711/135 |
| 2002/0188801 | A1 * | 12/2002 | Green ................ 711/113 |
| 2003/0056143 | A1 * | 3/2003 | Prabhu ................ 714/13 |
| 2003/0084251 | A1 * | 5/2003 | Gaither et al. .......... 711/133 |
| 2005/0010834 | A1 * | 1/2005 | Chu .................. 713/600 |

OTHER PUBLICATIONS

M. Baker et al. "Measurements Of A Distributed File System." Proceedings of the 13th ACM Symposium On Operating Systems Principles. pp. 198-212. Oct. 1991.
T. Anderson. "MBFS: A Memory-Based File System." Unpublished dissertations submitted for Doctor's degree at Unversity of Kentucky Library. 1999.

* cited by examiner

*Primary Examiner*—Sanjiv Shah
*Assistant Examiner*—Yaima Campos
(74) *Attorney, Agent, or Firm*—Hanley, Flight & Zimmerman, LLC

(57) ABSTRACT

Variable write back delay apparatus, methods and articles of manufacture are disclosed. The disclosed variable write back delay apparatus, methods and articles of manufacture identify a probability associated with a loss of a file and determine the write back delay based on the probability associated with the loss of the file. The disclosed apparatus, methods and articles of manufacture associate a write back delay with each file that results in a minimal expected total time cost of recreating and storing that file.

50 Claims, 8 Drawing Sheets

VARIABLE WRITE BACK DELAY APPARATUS AND METHODS

FIELD OF THE DISCLOSURE

The present disclosure relates generally to file systems and, more specifically, to variable write back delay apparatus and methods for use with file systems.

BACKGROUND

File systems employing write back delay significantly reduce the processing penalties that are inherent in file systems employing synchronous write back techniques. With some synchronous write back techniques, if an application modifies file data that is currently stored in a volatile memory (e.g., a random access memory (RAM)) and which is also to be stored in a non-volatile memory (e.g., a disk drive), the application blocks (i.e., prevents further modification of that file data by that application or another application) until the modifications have been committed or written to the non-volatile memory. The non-volatile memory is typically a mass storage device such as, for example, a disk drive having a relatively large latency (i.e., data access or read/write time). As a result, repeated synchronous data write backs provide a high degree of data persistence but introduce significant application processing delays. Furthermore, in cases where the file being modified is part of a distributed file system (e.g., a file system operating within a client server-based system), the synchronous write backs generate a significant amount of network traffic, thereby generating significant network transmission delays that compound the processing delays due to non-volatile memory latency.

In file systems that employ write back delay, programs write data to files via "dirty pages" that are initially stored in volatile memory (e.g., RAM). The newly written data within these dirty pages is periodically (e.g., every thirty seconds) flushed or saved to the non-volatile memory (e.g., a disk drive). In this manner, the write back delay enables the file system to consolidate multiple writes (i.e., data modifications, changes, etc.) to a file (i.e., the dirty pages stored in volatile memory) during the write back delay interval before committing or writing the changes to the non-volatile memory. Such consolidation reduces the overall number of storage operations (e.g., disk writes) to the non-volatile memory, thereby increasing the amount of processor time available for executing an application and increasing the available non-volatile memory bandwidth.

Additionally, in the case of a distributed file system, fewer storage operations (e.g., disk writes by a centralized file server) results in fewer client to server information transfers and, thus, an increase in available network bandwidth. Further, file systems employing write back delay enable the file system to further increase processing efficiency by optimizing the order in which dirty page data is written to the non-volatile memory. Still further, because many applications create and eliminate a significant percentage of files within a relatively short period of time, the write back delay eliminates the need to write back any data associated with a file that expires or is deleted within the write back delay period, thereby further reducing network traffic (in the case of a distributed file system) and increasing overall processing efficiency.

In known file systems, the time period selected for the write back delay achieves a compromise between data persistence and processing performance. In other words, because file data stored in volatile memory may be lost as a result of a power failure or some other processing system event, a longer write back delay increases processing performance at the expense of increasing the probability of losing a file.

Unfortunately, known file systems typically utilize a fixed or static write back delay and, as a result, treat all files equally. For example, data that would be very time consuming to regenerate (e.g., critical data entered by hand) is exposed to the same write back delay period and, thus, the same probability of loss due to system failure or the like as data that would be very easy to regenerate (e.g., data generated in an automated fashion from persistent data sources). Thus, systems employing a static or fixed write back delay fail to consider the time cost of having to re-create and store various types of data and files. In other words, with a fixed write back delay, some files having a relatively low time cost (e.g., files that are easily and quickly regenerated and stored) will be saved to non-volatile memory more often than is optimal, while other files having a relatively high time cost will be saved too infrequently.

DETAILED DESCRIPTION

Figure 1:
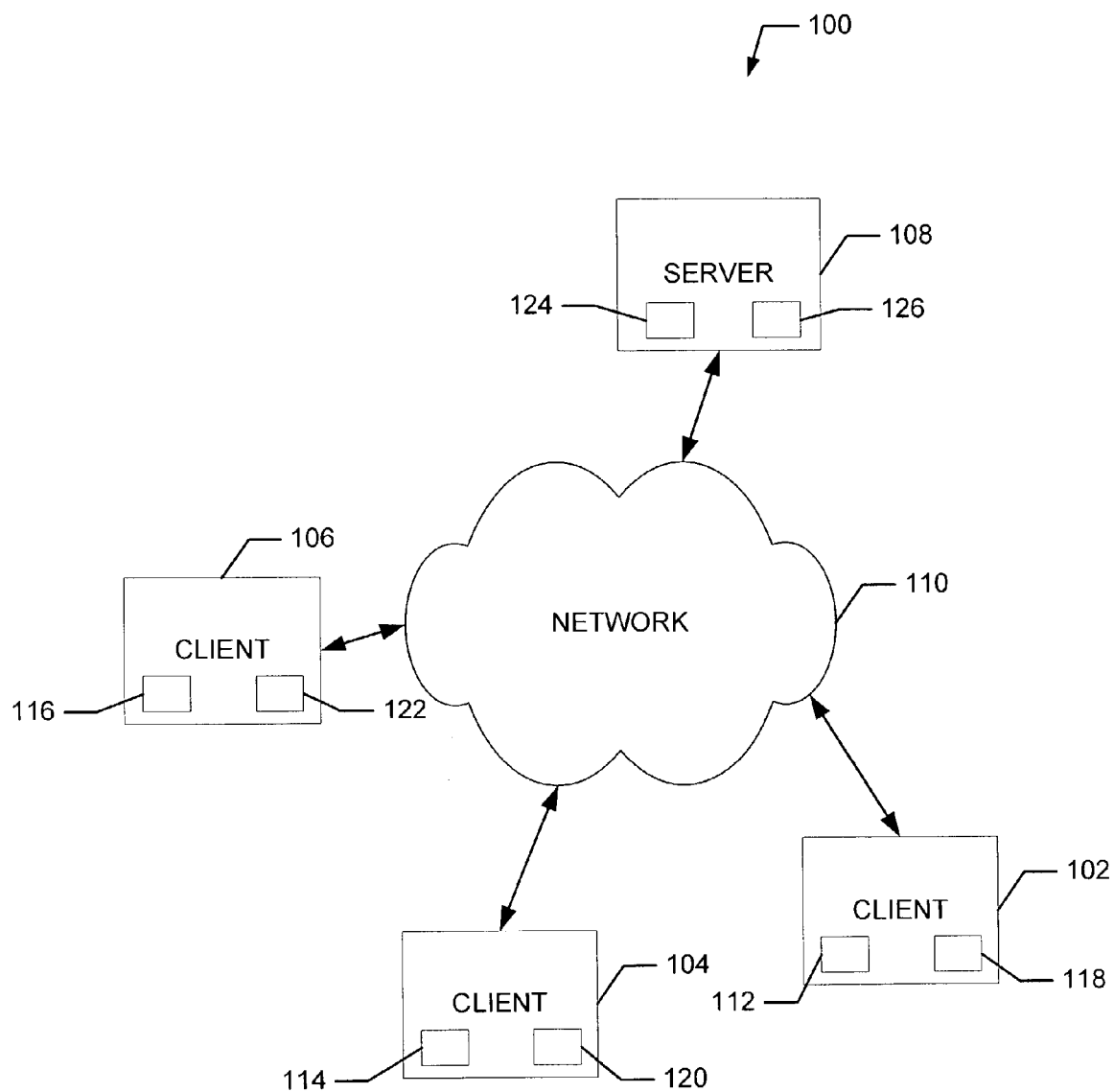
FIG. 1 is a block diagram of an example system within which the variable write back delay apparatus and methods described herein may be implemented.

FIG. 1 is a block diagram of an example system 100 within which the variable write back delay apparatus and methods described herein may be implemented. The example system 100 includes a plurality of clients 102, 104 and 106 and a server 108, all of which are communicatively coupled to a network 110. Each of the clients 102-106 and the server 108 may be implemented using a workstation, computer system or any other desired processing system capable of executing machine readable instructions such as, for example, firmware or software.

Each of the clients 102-106 includes a volatile memory 112, 114 and 116 and a non-volatile memory 118, 120 and 122. Likewise the server 108 includes a volatile memory 124 and a non-volatile memory 126. The volatile memories 112-116 and 124 may be implemented using, for example, random access memory (RAM) or any other suitable volatile solid state or media-based memory devices. The non-volatile memories 118-122 and 126 may be implemented using, for example, a disk drive that stores information on a magnetic or optical media, flash memory, electrically erasable programmable read only memory (EEPROM), or any other suitable non-volatile memory device, media and/or combination thereof.

The network 110 may be implemented using any desired combination of hardwired and/or wireless communication media and protocols. For example, the network 110 may be an Ethernet-based network, may be based on the use of a packet-switched network (e.g., the Internet), may use telephone lines, satellite communications, cellular communication systems and techniques, etc. In any event, the network 110 enables the clients 102-106 to communicate and, thus, interoperate with each other and/or the server 108. While three clients and one server are shown in the example system 100 of FIG. 1, more or fewer clients and/or servers could be used instead.

In operation, each of the clients 102-106 executes one or more software applications and/or may cooperate with each other and/or the sever 108 to execute one or more software applications. More specifically, the server 108 may be programmed to function as a centralized file server that stores in its non-volatile memory 126 copies of files or data used by applications executed by one or more of the clients 102-106. In that case, the server 108 maintains centralized control over (i.e., hosts) the files or data used by the clients 102-106, and each of the clients 102-106 stores the files or data needed to carry out its functions in its respective volatile memory 112-116.

Figure 2:
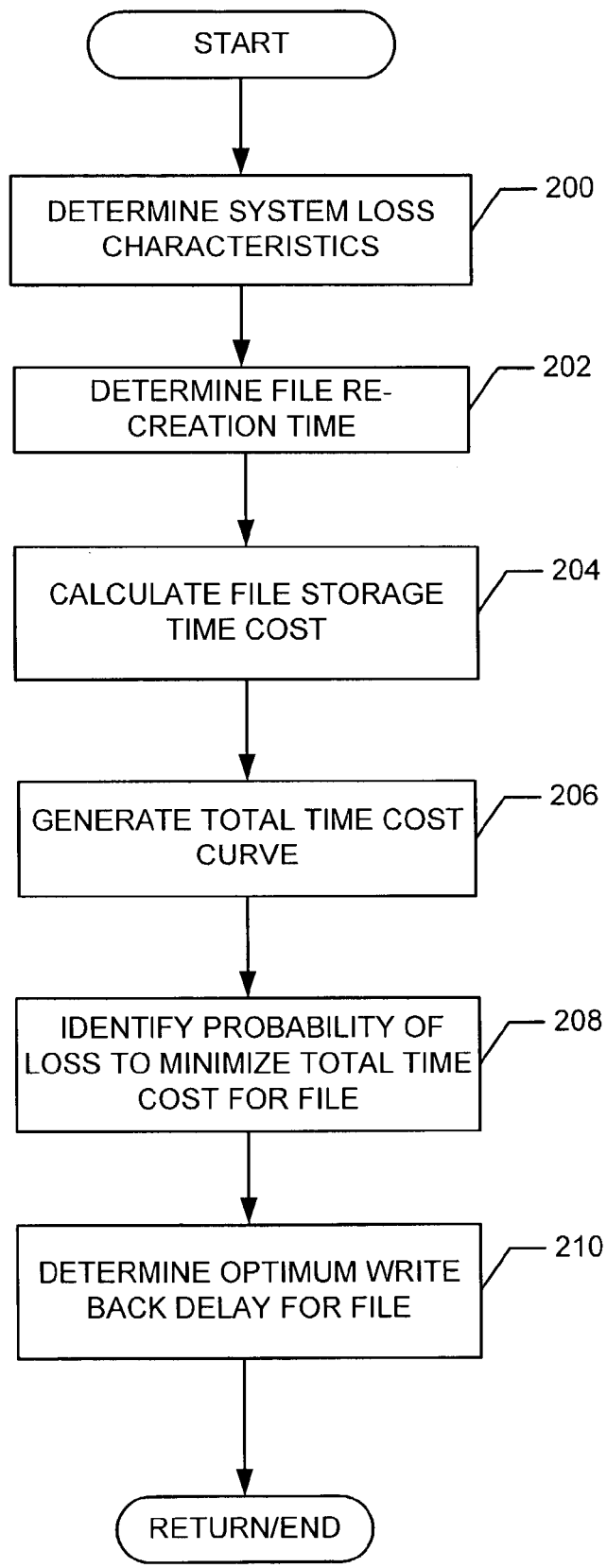
FIG. 2 is a flow diagram that is representative of example machine readable instructions that may be executed by the clients and/or the server of FIG. 1 to perform the variable write back delay methods described herein.

FIG. 2 is a flow diagram that depicts an example manner in which the clients 102-106 and the server 108 may be configured to perform the variable write back delay methods described herein. For purposes of simplifying the discussion, the example method depicted in FIG. 2 is described in connection with the client 102. However, the example method depicted in FIG. 2 can be implemented by the other clients 104 and 106 and/or the server 108.

Initially, the system loss characteristics of the client 102 are determined (block 200). For example, system loss characteristics of a system or machine can be determined via an empirical study of the historical operational behavior of that system or machine. More specifically, the average time between, and temporal distribution of, historical system crashes or other system events that result in the contents of a volatile memory within the system being lost can be used to determine the probability that such a crash or event will occur (and that the contents of volatile memory will be lost) within a given elapsed time period. In other words, the probability that files or data stored in the volatile memory (e.g., RAM) of a particular machine or system vanes as a function of elapsed time. Of course, the probability of losing a file or data stored within a volatile memory of a system tends to increase with elapsed time because the likelihood of system failure tends to increase with elapsed time.

Figure 3:
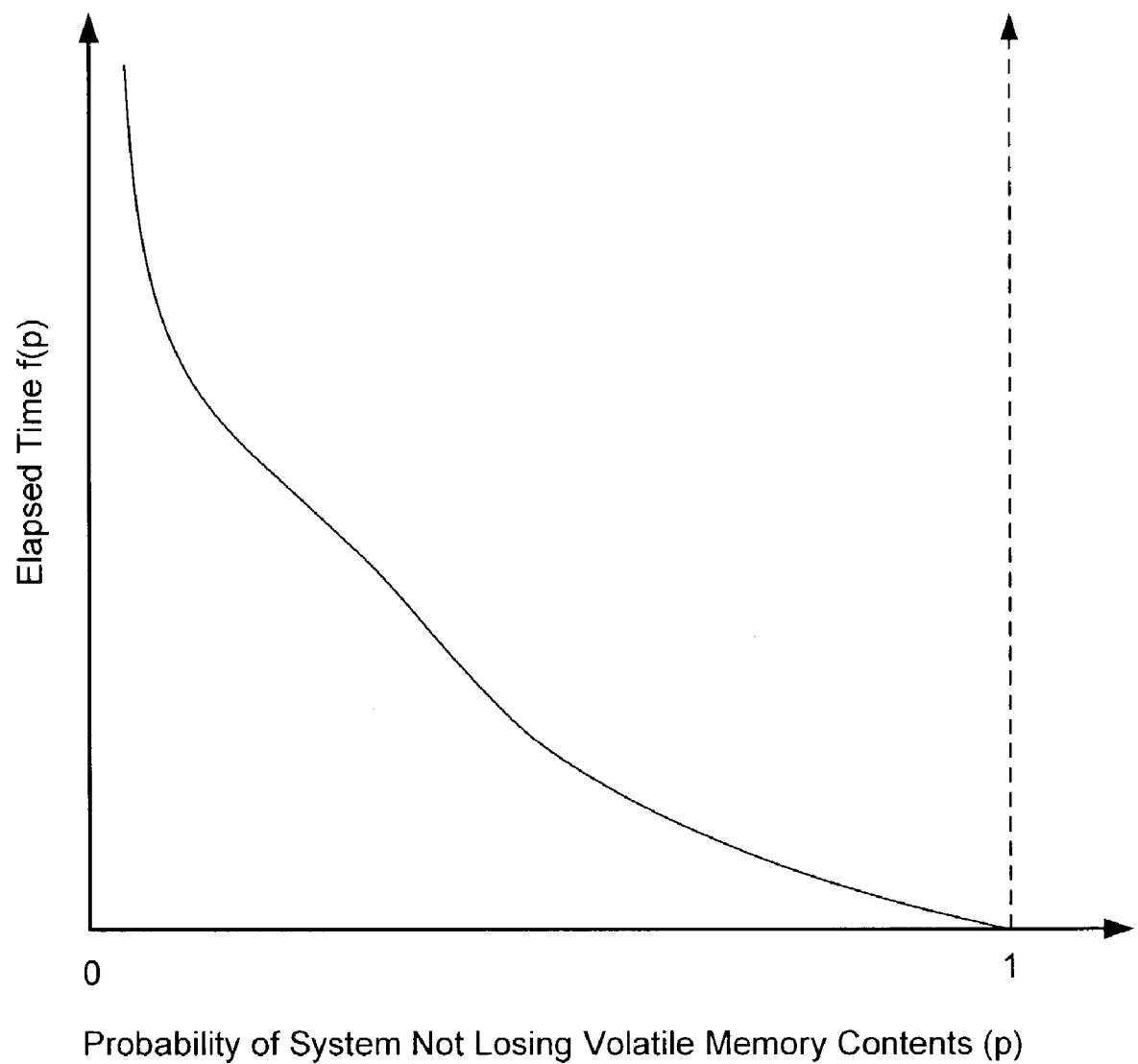
FIG. 3 is a graph of an example system loss characteristic.

FIG. 3 is a graph of an example system loss characteristic that may be associated with the system used to implement the client 102 (FIG. 1). As can be seen in the example system loss characteristic, at an elapsed time of zero, the probability that the client 102 will not lose the contents of its volatile memory 112 equals one. Further, as the elapsed time increases, the probability that the client 102 will not lose the contents of its volatile memory 112 asymptotically approaches zero (i.e., the likelihood of losing files or data stored in the volatile memory 112 increases as the elapsed time increases). In the example depicted in FIG. 3, the relationship between elapsed time and the probability that the client 102 will not lose the contents of its volatile memory 112 is generally monotonic.

Referring again to FIG. 2, after determining the system loss characteristics at block 200, the time required to re-create a file stored in the volatile memory 112 of the client 102 is determined (block 202). The file re-creation time can be expressed as real time (i.e., wall clock time). In that case, the method of FIG. 2 can be performed without having to first determine whether the client application accessing and modifying the file in the volatile memory 112 is utilizing purely processor time (e.g., performing only computations) or whether the application is waiting for a user input.

Alternatively, the file re-creation time can be expressed as either real time or processor time based on whether the application modifying the file requires user input. In other words, if it is determined that the application modifying the file requires user input, the file re-creation time is automatically expressed as real time and, if no user input is required, the file re-creation time is automatically expressed as processor time. This alternative approach recognizes the difference between an automated process or application and a manual process or application. For example, a complier (which is an automated process not requiring user intervention or input) consuming one second of real time also consumes one second of processor time. In contrast, a text editing application (which requires user input or intervention) may execute for several minutes of real time before one second of processor time has been consumed.

The storage time cost associated with the file stored in the volatile memory 112 is determined at block 204. In general, storage time costs are storage times that impose a real-time delay on a process being used by a system user (e.g., a user of the client 102). In other words, if the user's process is not delayed, then there is no storage time cost to the user. For example, if a user of a text editing application at the client 102 takes an action that initiates a change to a file stored in the volatile memory 112 and then pauses to think about a next action while the client commits the changed file to its non-volatile memory 118, the user experiences no real-time delay and, thus, no storage time cost is incurred.

User process delays occur at the client 102 as a result of writing files to the non-volatile memory 118 (e.g., disk writes) in the event that the processing unit (e.g., the processor 802 of FIG. 8) within the client 102 is continuously active or busy between the time modified file information was created (and written to the volatile memory 112) and the time the file system associated with the client 102 is scheduled to write back the modified file data to the non-volatile memory 118. Put another way, the storage time cost associated with committing file data changes that are initially stored in the volatile memory 112 to the non-volatile memory 118 is reduced as the amount of data which can be written to the non-volatile memory 118 within the write back delay period of the client 102 increases.

Mathematically, the storage time cost s can be represented as shown in Equation 1 below, in which i(n) is the probability that the client 102 will be continuously active (e.g., the processing unit therein will be continuously busy) for the next n seconds and d(filesize) is the real time required to write the file being modified to the non-volatile memory 118.

$$s=i(n)*d(\text{filesize}) \quad\quad\quad \text{Equation 1}$$

The functions i(n) and d(filesize) can be determined empirically from observation of the operational behavior of the client 102. In general the function i(n) (i.e., the probability that a machine or system such as the client 102 will be continuously active for the next n seconds) expresses the interaction between an application and the processing characteristics (e.g., the processor speed, memory access times, etc.) of the machine or system that is executing that application. For example, a compiler executing on a relatively fast processing machine or system will exhibit relatively smaller probabilities (i(n) values) than a text editing application being executed by a relatively slow processing machine or system.

As can be seen from Equation 1, the storage time cost of the file is the statistically expected amount of real time required to commit or store the file within the non-volatile memory 118 of the client 102. More specifically, as explained in greater detail below, the storage time cost of a file is equal to the amount of real time required to write that file to the non-volatile memory 118 multiplied by the probability that there will not be sufficient processor time available (i.e., idle time) within the write back delay period to store or commit the file changes to the non-volatile memory 118.

The storage time cost s can be expressed as a function of p (i.e., the probability of a system not losing its volatile memory contents) by mapping the function $f(p)$ shown in FIG. 3 to the function i(n). Mathematically, this mapping is expressed as shown in Equation 2 below.

$$s(p)=i(f(p))*d(\text{filesize}) \quad \text{Equation 2}$$

The system loss characteristics, the file re-creation time and the file storage time cost determined or calculated at respective blocks 200, 202 and 204 are used to generate the total time cost curve associated with the file being modified within the volatile memory 112 of the client 102 (block 206). The time cost to create and store a file for the first time equals r+s(p), where r equals the file re-creation time. However, there is a probability (1−p) that the data created (i.e., the modified file stored in volatile memory 112) will be lost between its initial creation and the time at which it is committed or written to the non-volatile memory 118 (e.g., one write back delay period later). In the event that the data is lost, the data would be re-created and stored in volatile memory a second time at an incremental time cost of r+s(p). However, there is a (1−p)*(1−p) chance that the file will be lost a second time. Of course, successive losses and re-creations will occur with progressively smaller probabilities. Thus, the expected total time cost for a particular system and application executed thereby can be expressed as shown in Equation 3 below.

$$timecost = (r + s(p)) \sum_{i=0}^{\infty} (1 - p)^i \quad \text{Equation 3}$$

Equation 3 can be simplified to become the total expected time cost curve given by Equation 4 below.

$$timecost = (r + s(p))\left(\frac{1}{p}\right) \quad \text{Equation 4}$$

Figure 4:
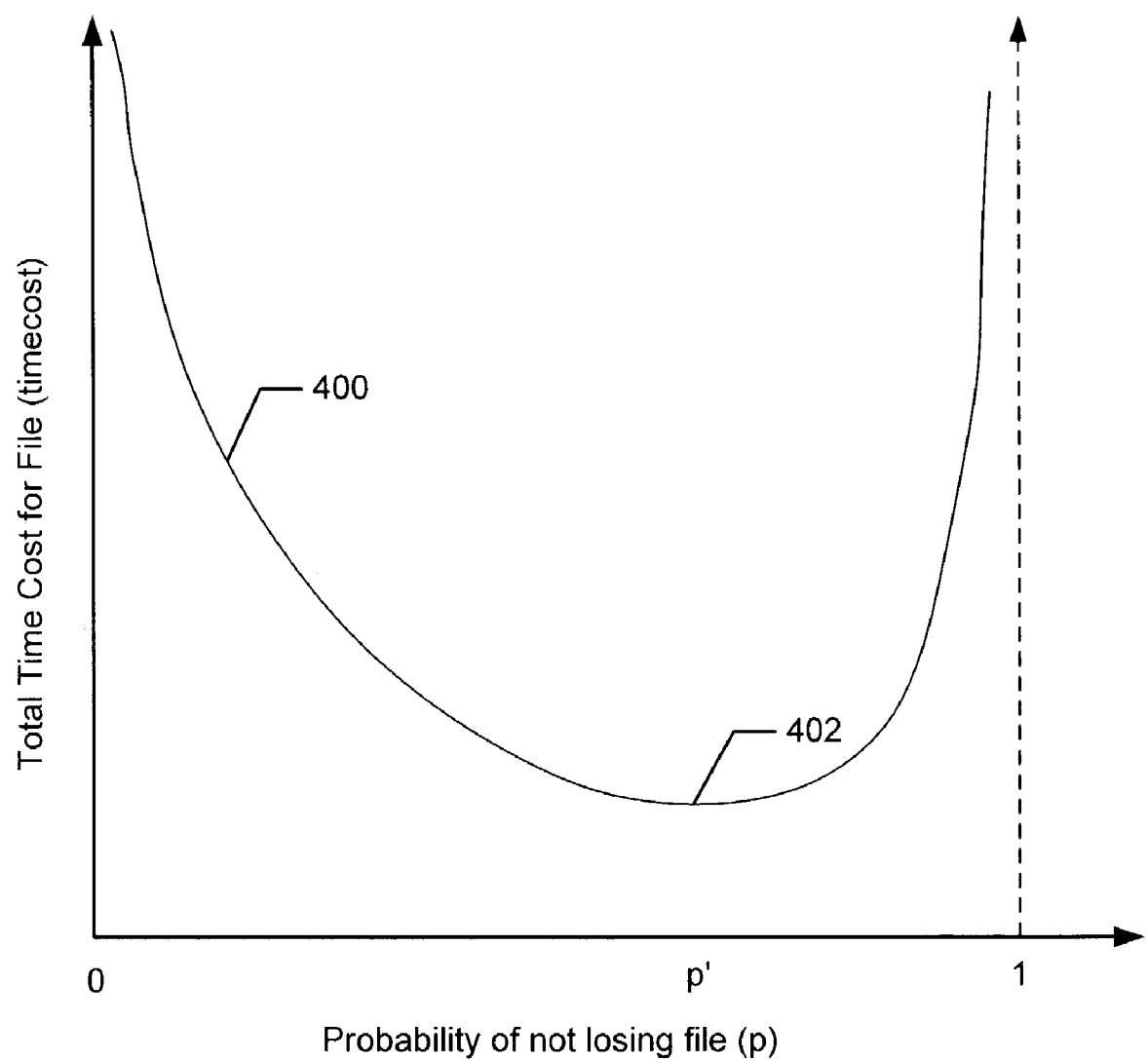
FIG. 4 is a graph of an example total time cost curve.

FIG. 4 is a graph of an example total time cost curve 400 associated with a particular file stored within a particular system (e.g., the client 102). The curve 400 of FIG. 4 graphically represents Equation 4 for the particular file and system in question. As shown in FIG. 4, as the probability p of not losing the particular file approaches zero, the total time cost (timecost) asymptotically approaches infinity. Likewise, as the probability p approaches one, the total time cost (timecost) asymptotically approaches infinity. A minimum total time cost 402 occurs at a probability p'.

Figure 5:
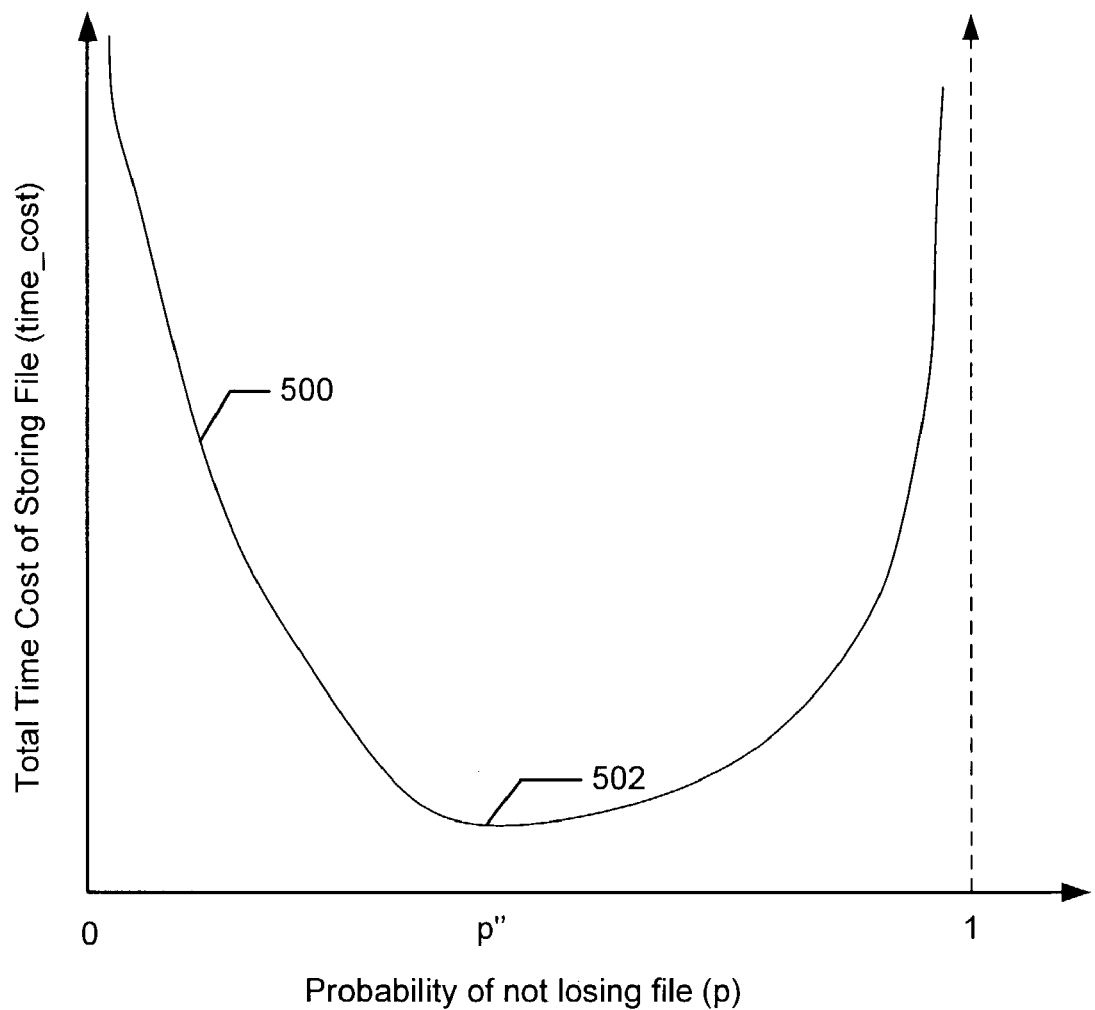
FIG. 5 is a graph of another example total time cost curve.

FIG. 5 is a graph of another example total time cost curve 500 that may be associated with another file stored within the same system as that associated with the time cost curve 400 of FIG. 4. Alternatively, the total time cost curve 500 could be associated with the same file as that associated with the total time cost curve 400 of FIG. 4 but handled by a different system (e.g., the client 104 rather than the client 102). As depicted in FIG. 5, the example total time cost curve 500 has a minimum total time cost 502 that occurs at a probability p".

In any case, the curves 400 and 500 of FIGS. 4 and 5 are differently shaped and, thus, illustrate that the total time cost of recreating and storing a particular file on a particular system is a function of the probability of loss of that file which, in turn, is a function of the operational characteristics of the particular system, the application accessing that file on the system and the size of the file. Further, the curves 400 and 500 also illustrate that two different files may have different total time cost characteristics when used in connection with the same system.

Returning to FIG. 2, the total cost time curve generated at block 206 is used to calculate the probability of loss that minimizes the total time cost for the file and system in question (block 208). Finding the minimum total time cost can be carried out by taking the derivative of Equation 4, setting the derivative equal to zero and solving for p. As depicted in the example graph of FIG. 4, such an optimal probability occurs at p', which coincides with the minimum total time cost 402. Similarly, for the curve 500 shown in FIG. 5, an optimal probability occurs at p", which coincides with the minimum total time cost 502.

Figure 6:
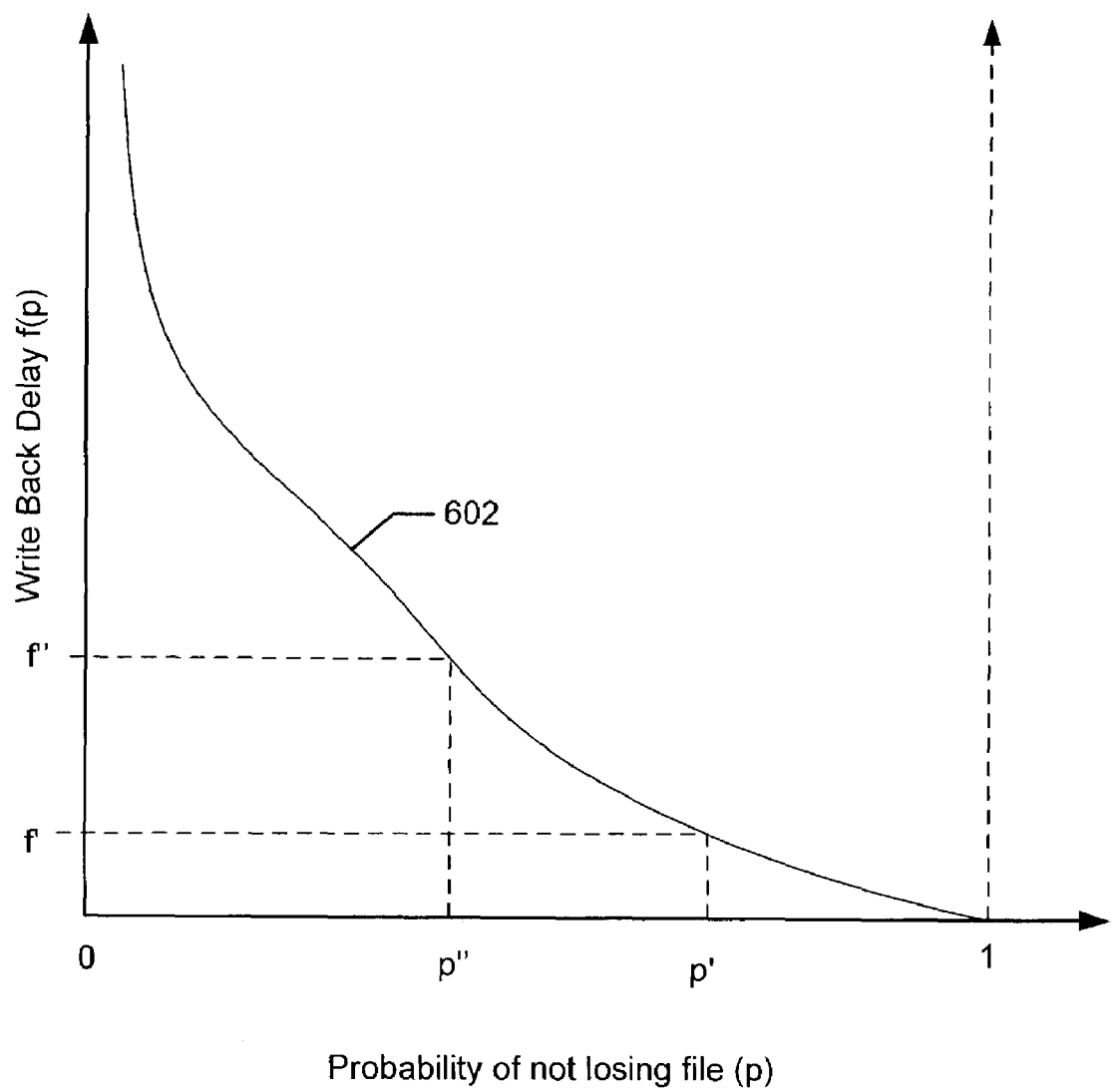
FIG. 6 graphically depicts an example of one manner in which optimal probabilities may be mapped to write back delays.

Once an optimal probability (i.e., the probability of loss that minimizes the total time cost for a file) has been determined (block 208), that optimal probability is mapped to a write back delay that will yield minimal time cost for the file associated with that optimal probability (block 210). FIG. 6 depicts an example of such a mapping process. The write back delay function 602 is identical to the loss characteristic of the system for which a write back delay is to be calculated. In the example of FIG. 6, the write back delay function 602 is the same as the system loss characteristic shown in FIG. 3. The probabilities p' and p" associated with the total time cost curves 400 and 500 of FIGS. 4 and 5 can be mapped to respective write back delays f' and f". Thus, if the system loss characteristic of FIG. 3 (and, thus, the write back delay curve 602 of FIG. 6) corresponds to the client 102, optimal expected total time cost will be achieved for the file associated with the curve 400 with a write back delay of f' and optimal expected total time cost will be achieved for the file associated with the curve 500 with a write back delay of f".

Figure 7:
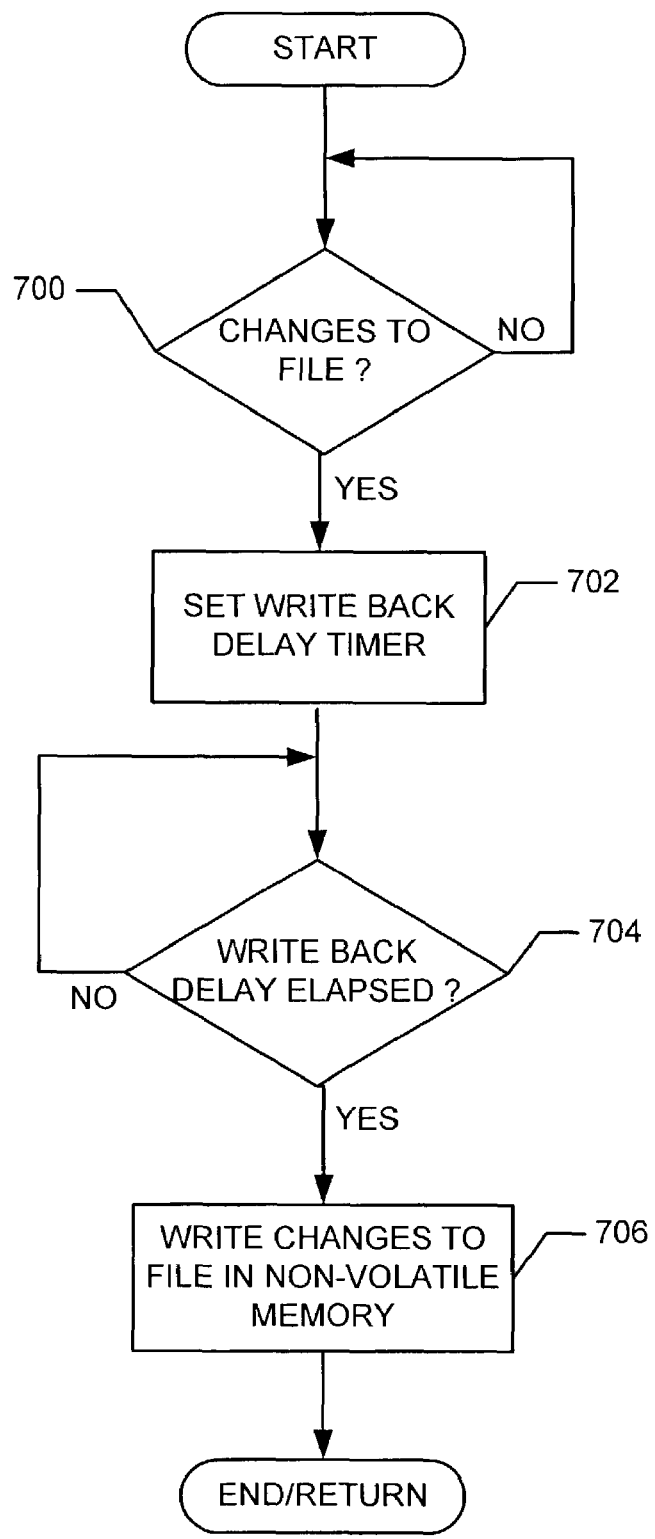
FIG. 7 is a flow diagram representative of example machine readable instructions that may be executed to permit a file system to use an optimal write back delay to commit files to a non-volatile memory.

FIG. 7 is a flow diagram of an example method by which a file system may use the optimal write back delay determined using the example method of FIG. 2 to store files modified by an application executing in the client 102 in the non-volatile memory 118. Initially, the file system determines if changes were made to a file (block 700). If changes to the file have been made, the file system sets a write back delay timer equal to an optimal write back delay time (block 702). The optimal write back delay time may be determined using the example method depicted in FIG. 2. The file system then determines if the write back delay time has elapsed (i.e., has counted down to zero) (block 704). If the write back delay timer has elapsed, the file system then commits or writes the changes to the non-volatile memory 118 (block 706). In the case where the non-volatile memory 118 is a disk drive, the changes are written to the disk media. The application executing within the client 102 could potentially make one or more changes to the file during the write back delay interval (i.e., while the file system is looping at block 704). Changes to the file may be detected by, for example, finding one or more dirty pages associated with the files that are stored in the volatile memory 112 of the client.

From the foregoing, persons of ordinary skill in the art will appreciate that the methods and apparatus described herein enable a file system to vary the write back delay on a file-by-file basis to minimize the total expected time cost for each file. The variable write back delay apparatus and methods described herein can be used in a stand alone system or locally (e.g., within the client 102) or, alternatively, can be used within multiple systems or entities within a distributed file system. In the case where the variable write back delay apparatus and methods are used locally (i.e., within a single system), the overall amount of write activity to the non-volatile memory at that system can be reduced, which increases the effective bandwidth of the non-volatile memory available to applications or processes being executed by that system. The overall reduction in non-volatile memory activity may also provide an increased amount of processing unit time available to execute the applications, thereby increasing overall system performance.

The variable write back delay apparatus and methods illustrated herein can also be applied at multiple levels of a system hierarchy to improve the performance of a distributed system. For example, each of the clients 102-106 could be configured to optimize the write back delays for the files each of these clients 102-106 is modifying and committing to their respective non-volatile memories 118-122 to optimize their local performance. Similarly, the server 108 could be configured to optimize its write back delays on a file-by-file basis to optimize its local performance with respect to its non-volatile memory 126.

Additionally, the variable write back delay apparatus and methods described herein can be used to control the manner in which the clients 102-106 commit changes to files hosted by the server 108. For example, the clients 102-106 could employ optimal write back delay periods for file changes made locally and commit changes to the server 108 in accordance with those optimal write back delay periods. In this manner, the variable write back delay apparatus and methods described herein affect an overall reduction in communications via the network 110 (i.e., increase available bandwidth on the network 110). Thus, application of the variable write back delay apparatus and methods disclosed herein to the server 108 increases the available bandwidth of its non-volatile memory 126. In addition, application of the variable write back delay apparatus and methods disclosed herein to the clients 102-106 increases the available bandwidth of the network 110. As a result, the example system 100 illustrated herein is more scalable than a system that uses a fixed write back delay because the server 108 can service more clients and/or can service more files for a given number of clients owing to an overall reduction in network communications between the clients 102-106 and the server 108, and an overall reduction in the number of writes to the non-volatile memory 126.

The variable write back delay methods and apparatus described herein may be implemented using machine readable instructions (e.g., a program) executed by a processor such as the processor 802 shown in the example computer or processor system 800 discussed below in connection with FIG. 8. Such machine readable instructions or program may be embodied in software stored on a tangible medium such as a CD-ROM, a floppy disk, a hard drive, a digital versatile disk (DVD), or a memory associated with the processor 802, but persons of ordinary skill in the art will readily appreciate that the entire program and/or parts thereof could alternatively be executed by a device other than the processor 802 and/or embodied in firmware or dedicated hardware in a well-known manner. Additionally, the order of execution of the blocks shown in FIGS. 2 and 7 may be changed, and/or some of the blocks described may be changed, eliminated, or combined.

Figure 8:
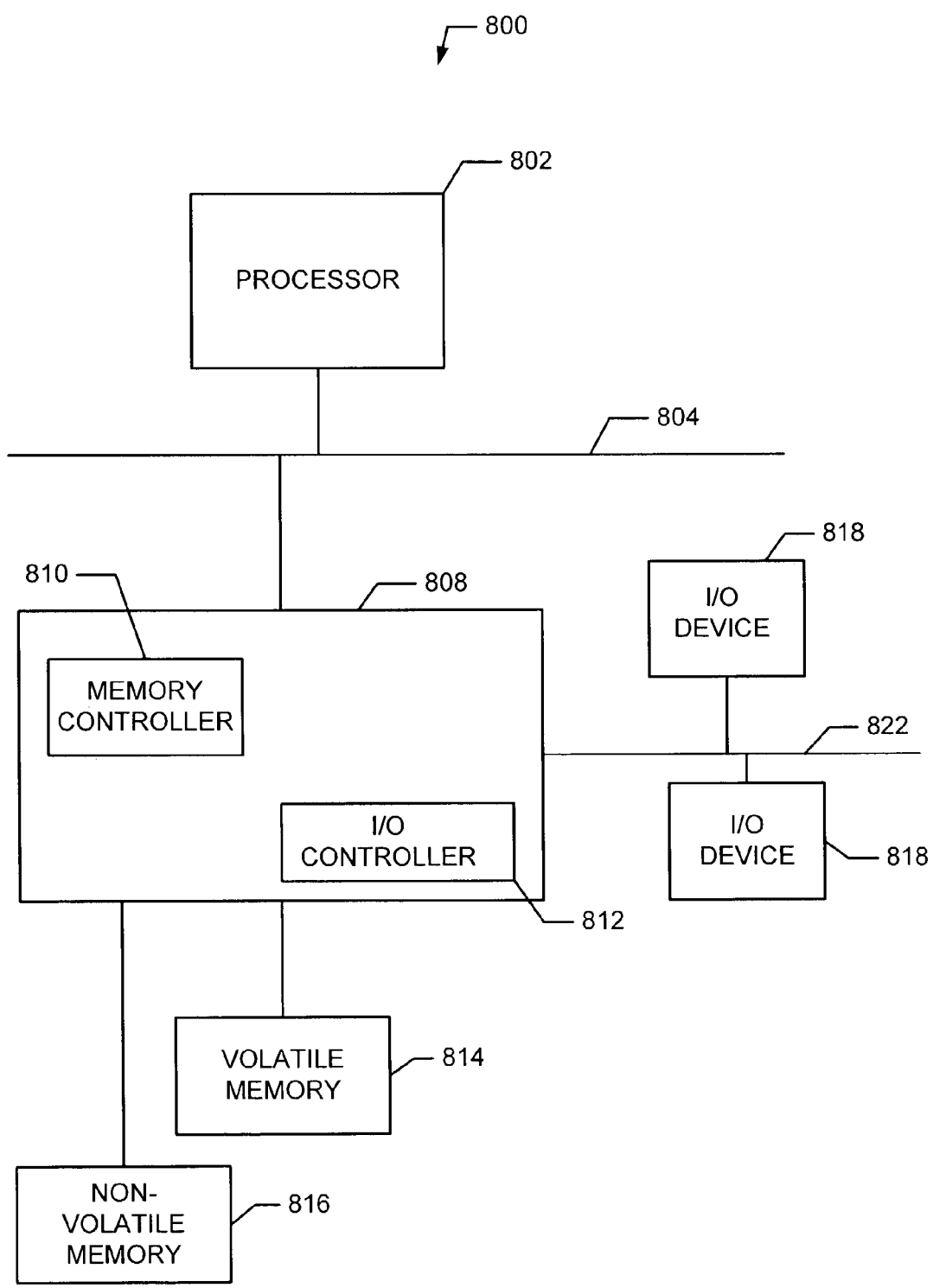
FIG. 8 is a block diagram of an example processor system that may be used to implement the apparatus and methods described herein.

FIG. 8 is a block diagram of an example processor system 800 that may be used to implement the examples described herein. For example, each of the clients 102-106 and/or the server 108 shown in FIG. 1 could be implemented using a system similar or identical to the example system 800 of FIG. 8. The processor system 800 can be, for example, a server, a personal computer, a personal digital assistant (PDA), an Internet appliance, or any other type of computing device.

As shown in FIG. 8, the processor system 800 includes a processor 802 that is coupled to an interconnection bus or network 804. The processor 802 can be a processing unit or microprocessor such as, for example, a processor selected from the Intel Itanium® family, Intel X-Scale® family, the Intel Pentium® family, etc. Although not shown in FIG. 8, the system 800 may be a multi-processor system and, thus, may include one or more additional processors that are identical or similar to the processor 802 and which are coupled to the interconnection bus or network 804.

The processor 802 of FIG. 8 is coupled to a chipset 808, which includes a memory controller 810 and an input/output (I/O) controller 812. As is well known, a chipset typically provides I/O and memory management functions as well as a plurality of general purpose and/or special purpose registers, timers, etc. that are accessible or used by one or more processors coupled to the chipset. The memory controller 810 performs functions that enable the processor 802 (or processors if there are multiple processors) to access a volatile memory 814, which may include any desired type of volatile memory such as, for example, synchronous dynamic random access memory (SDRAM), dynamic random access memory (DRAM), RAMBUS dynamic random access memory (RDRAM), etc. The memory controller 810 may also have access to a non-volatile memory 816, which may include, for example, on-board read only memories (ROMs) implemented using, for example, electrically erasable programmable read only memory (EEPROM) or any other type of read only memory.

The I/O controller 812 performs functions that enable the processor 802 to communicate with devices 818 and 820 via a bus 822. The devices 818 and 820 may be any desired type of device such as, for example, a video adapter, a disk drive (e.g., a mass storage device), a network interface adapter, etc.

While the memory controller 810 and the I/O controller 812 are depicted in FIG. 8 as separate functional blocks within the chipset 808, the functions performed by these blocks may be integrated within a single semiconductor circuit or may be implemented using two or more separate integrated circuits.

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of determining a write back delay comprising:
    identifying a characteristic associated with a loss of a file;
    generating a total time cost curve associated with the file;
    calculating a minimum value of the total time cost curve by taking the derivative of the total time cost curve and solving for a probability, wherein the probability is at least one characteristic associated with the loss of the file; and
    determining a write back delay time based on the characteristic of the file.

2. A method as defined in claim 1, wherein the probability comprises a probability of not losing the file.

3. A method as defined in claim 1, further comprising calculating the minimum value based on a creation time for the file and a storage time cost for the file.

4. A method as defined in claim 3, wherein the storage time cost for the file is based on at least a probability associated with writing the file to a non-volatile memory during the minimum write back delay time.

5. A method as defined in claim 1, further comprising determining the write back delay time based on a system loss characteristic to determine the write back delay time.

6. A method as defined in claim 5, wherein the system loss characteristic is based on an operational characteristic of a system that accesses the file.

7. A method as defined in claim 6, wherein the operational characteristic of the system is associated with a temporal distribution of failures of the system.

8. A method as defined in claim 7, wherein each of the failures of the system results in a loss of information from a volatile memory coupled to the system.

9. A method as defined in claim 6, wherein the system is a local system.

10. A method as defined in claim 6, wherein the system is a distributed system.

11. A system for determining a write back delay comprising:
    a memory; and
    a processor coupled to the memory and programmed to:
        identify a characteristic associated with a loss of a file;
        generate a total time cost curve associated with the file;
        calculate a minimum value of the total time cost curve by taking the derivative of the total time cost curve and solving for a probability, wherein the probability is at least one characteristic associated with the loss of the file; and
        determine a write back delay time based on the characteristic of the file.

12. A system as defined in claim 11, wherein the probability comprises a probability of not losing the file.

13. A system as defined in claim 11, wherein the processor is further programmed to calculate the minimum value based on a creation time for the file and a storage time cost for the file.

14. A system as defined in claim 13, wherein the storage time cost for the file is based on at least a probability associated with writing the file to a non-volatile memory during the minimum write back delay time.

15. A system as defined in claim 11, wherein the processor determines the write back delay time based on the probability associated with the loss of the file by using a system loss characteristic.

16. A system as defined in claim 15, wherein the system loss characteristic is based on an operational characteristic of a system that accesses the file.

17. A system as defined in claim 16, wherein the operational characteristic of the system is associated with a temporal distribution of failures of the system.

18. A system as defined in claim 17, wherein each of the failures of the system results in a loss of information from a volatile memory coupled to the system.

19. A system as defined in claim 16, wherein the system is a local system.

20. A system as defined in claim 16, wherein the system is a distributed system.

21. A machine readable medium having instructions stored thereon that, when executed, cause a machine to:
    identify a characteristic associated with a loss of a file;
    generate a total time cost curve associated with the file;
    calculate a minimum value of the total time cost curve by taking the derivative of the total time cost curve and solving for a probability, wherein the probability is at least one characteristic associated with the loss of the file; and
    determine a write back delay time based on the characteristic of the file.

22. A machine readable medium as defined in claim 21, wherein the probability comprises a probability of not losing the file.

23. A machine readable medium as defined in claim 21 having instructions stored thereon that, when executed, cause the machine to calculate the minimum value based on a creation time for the file and a storage time cost for the file.

24. A machine readable medium as defined in claim 23, wherein the storage time cost for the file is based on at least a probability associated with writing the file to a non-volatile memory during the minimum write back delay time.

25. A machine readable medium as defined in claim 21, having instructions stored thereon that, when executed, cause the machine to determine the write back delay time based on a system loss characteristic.

26. A machine readable medium as defined in claim 25, wherein the system loss characteristic is based on an operational characteristic of a system that accesses the file to determine the write back delay time.

27. A machine readable medium as defined in claim 26, wherein the operational characteristic of the system is associated with a temporal distribution of failures of the system.

28. A machine readable medium as defined in claim 27, wherein each of the failures of the system results in a loss of information from a volatile memory coupled to the system.

29. A machine readable medium as defined in claim 26, wherein the system is a local system.

30. A machine readable medium as defined in claim 26, wherein the system is a distributed system.

31. A method of writing a file to a non-volatile memory, comprising:
    generating a total time cost curve associated with the file;
    calculating a minimum value of the total time cost curve by taking the derivative of the total time cost curve and solving for a probability;
    determining a write back delay time based, at least in part, on the minimum value of the total time cost curve; and
    writing the file to the non-volatile memory following a time period equal to the write back delay.

32. A method as defined in claim 31, wherein the write back delay time is based on a characteristic of the file comprising at least one of a file size, a re-creation time, or a storage time.

33. A method as defined in claim 31, further comprising determining the write back delay based on a characteristic of a system having a volatile memory containing at least a portion of the file.

34. A method as defined in claim 33, wherein the characteristic of the system is associated with a probability of losing the file.

35. A method as defined in claim 31, wherein the non-volatile memory is a disk drive.

36. A method as defined in claim 31, wherein writing the file to the non-volatile memory includes sending the file to the non-volatile memory via a network.

37. A system for writing a file to a non-volatile memory, comprising:
   a memory; and
   a processor programmed to:
      generate a total time cost curve associated with the file;
      calculate a minimum value of the total time cost curve by taking the derivative of the total time cost curve and solving for a probability;
      determine a write back delay time based, at least in part, on the minimum value of the total time cost curve; and
      write the file to the non-volatile memory following a time period equal to the write back delay.

38. A system as defined in claim 37, wherein the write back delay time is based on a characteristic of the file comprising at least one of a file size, a re-creation time, or a storage time.

39. A system as defined in claim 37, wherein the processor is programmed to determine the write back delay based on a characteristic of a system having a volatile memory containing at least a portion of the file.

40. A system as defined in claim 39, wherein the characteristic of the system is associated with a probability of losing the file.

41. A system as defined in claim 37, wherein the non-volatile memory is a disk drive.

42. A method as defined in claim 37, wherein the processor is programmed to write the file to the non-volatile memory by sending the file to the non-volatile memory via a network.

43. A machine readable medium having instructions stored thereon that, when executed, cause a machine to:
   generate a total time cost curve associated with a file;
   calculate a minimum value of the total time cost curve by taking the derivative of the total time cost curve and solving for a probability;
   determine a write back delay time based, at least in part, on the minimum value of the total time cost curve; and
   write the file to a non-volatile memory following a time period equal to the write back delay.

44. A machine readable medium as defined in claim 43 having instructions stored thereon that, when executed, cause the machine to determine the write back delay based on a characteristic of a system having a volatile memory containing at least a portion of the file.

45. A machine readable medium as defined in claim 43 having instructions stored thereon that, when executed, cause the machine to write the file to the non-volatile memory by sending the file to the non-volatile memory via a network.

46. A method of transmitting digital information, comprising:
   modifying the digital information at a first location;
   generating a total time cost curve associated with a file;
   calculating a minimum value of the total time cost curve by taking the derivative of the total time cost curve and solving for a probability, wherein the probability is at least one characteristic associated with a loss of the file;
   determining a write back delay time based at least in part on the digital information, and the characteristic of the file; and
   transmitting the digital information to a second location following a time period equal to the write back delay time.

47. A method as defined in claim 46, wherein the first location is a volatile memory and the second location is a non-volatile memory.

48. A method as defined in claim 47, wherein the volatile memory and the non-volatile memory are disposed within a processing system.

49. A method as defined in claim 46, wherein the first location is a client and the second location is a server.

50. A method as defined in claim 46, wherein the digital information is part of the file.

* * * * *